United States Patent [19]

Demeulemeester et al.

[11] Patent Number: 4,505,937
[45] Date of Patent: Mar. 19, 1985

[54] METHOD OF PASTEURIZING VEGETABLES FOR MARKETING

[76] Inventors: Jean R. Demeulemeester; Jean-Marc Demeulemeester, both of La Jacobée, Trevoux (Ain), France

[21] Appl. No.: 442,784

[22] Filed: Nov. 18, 1982

[51] Int. Cl.³ .............................................. C12H 1/00
[52] U.S. Cl. ...................................... 426/8; 426/520; 426/521; 426/407; 426/412
[58] Field of Search ................... 426/8, 521, 407, 412, 426/520

[56] References Cited

U.S. PATENT DOCUMENTS 3,873,753  3/1975  Nelson et al. ....................... 426/521
3,891,771  6/1975  Green et al. .
4,097,612  6/1978  Powrie .

FOREIGN PATENT DOCUMENTS 2465420  3/1981  France .
331161   6/1930  United Kingdom .

*Primary Examiner*—Sam Rosen
*Attorney, Agent, or Firm*—Karl F. Ross; Herbert Dubno

[57] ABSTRACT

Root and tuber vegetables, especially potatoes, can be prepared for sale by a process which increases their storage life and yet allows them to be treated as raw potatoes. The method involves a light sterilization at 75° to 85° C. followed by conditioning in vacuo and packaging in plastic pouches. The latter are then incubated at 25° to 35° C. for the controlled growth of bacteria and pores from within, sterilized and refrigerated.

13 Claims, 1 Drawing Figure

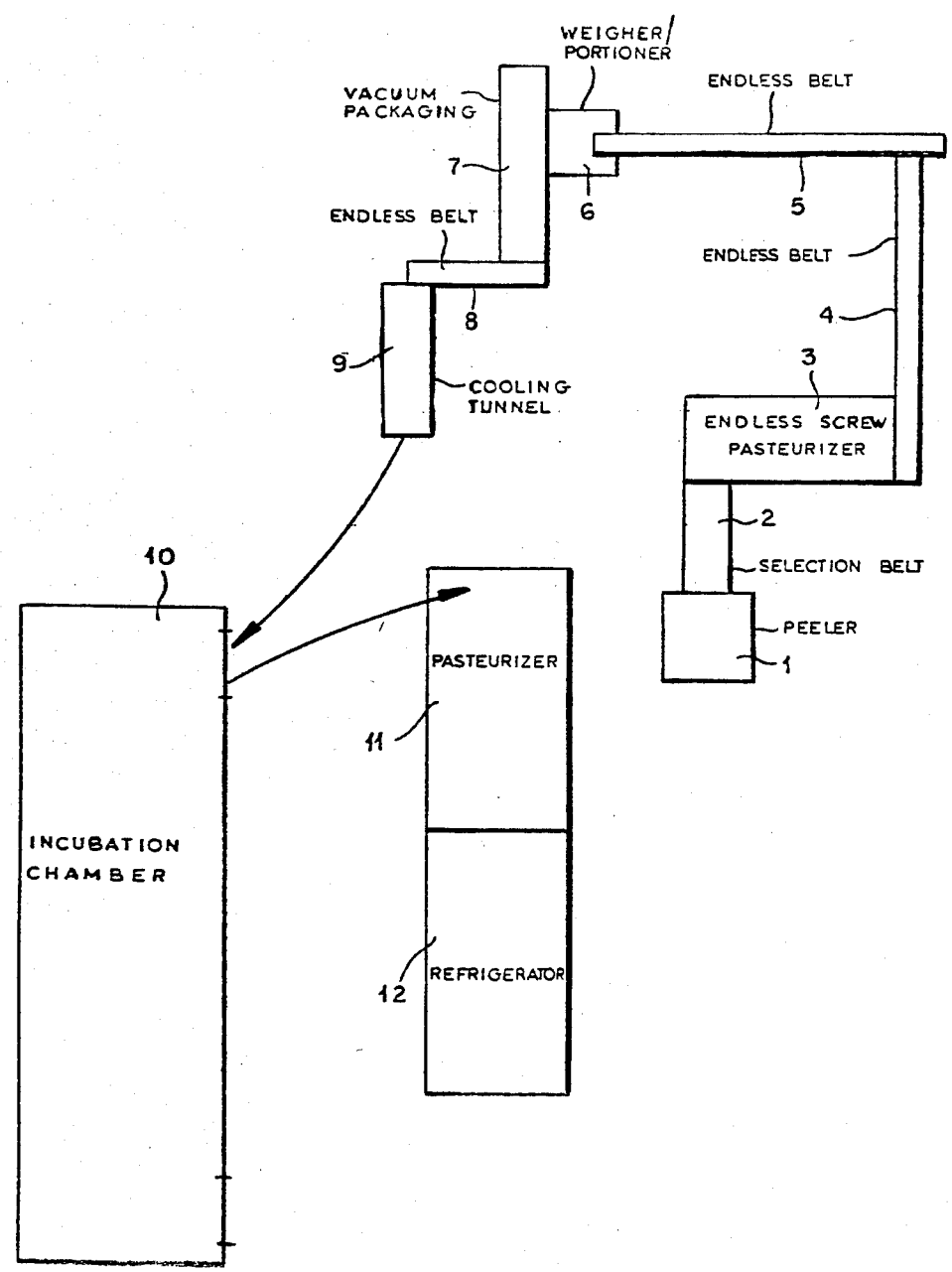

METHOD OF PASTEURIZING VEGETABLES FOR MARKETING

FIELD OF THE INVENTION

Our present invention relates to a treatment for vegetables for marketing and, more particularly, to a process capable of preparing root and tuber vegetables so as to increase the shelf life and facilitate the preparation of the produce for eating.

BACKGROUND OF THE INVENTION

The term "vegetables" as used herein is intended to include tubers and root vegetables especially potatoes, carrots, turnips, salsify and even asparagus. Since the potato is the dominant vegetable of this class with respect to its share of the market, the invention will be described primarily in connection therewith, although reference in the body of the description to the potato is not to be considered a limitation to it, but rather the identification of a vegetable of the class with which the invention is operative and hence by way of example rather than by way of limitation.

Reference will also be made herein to the presentation of a vegetable product for marketing. It is intended to thus identify a product which is packaged, has a comparatively long shelf life, and has a pleasing appearance, i.e. an appearance which is attractive to the point that a potential customer may be induced to purchase the product and to try it. Of course this preparation for marketing also includes the presentation of the product in a form which facilitates its use by the consumer.

Traditionally potatoes have been marketed in a raw state, in a condition of limited shelf life or duration to spoilage. After purchase, the potatoes must be peeled before they can be used.

To overcome both drawbacks, it has been proposed to treat potatoes in various ways to increase their storage life and facilitate their use. For example, the potatoes can be precooked after having been peeled, washed and "bleached" to prevent or limit discoloration during processing. The precooked product has a storage life of several days when maintained under refrigeration at temperatures of +2° to +5° C.

To open other potential markets for potatoes, they have been subjected to processes allowing them to be utilized in so called "instant" form, e.g. simply by the addition of water.

It has also been proposed to put up potatoes in a form which facilitates preparing a dish therefrom by a process involving a deep sterilization of the potato after it has been peeled and washed. In this case, the potatoes may be placed in pouches of synthetic resin material which are conditioned in vacuo and sterilized.

Potatoes treated in this way do indeed have a relatively long shelf life, but their commercial exploitation has been sharply inhibited by their high price. This is due to two key factors. Firstly, it is necessary to treat the material in a highly dense state and thus to work at a temperature between 115° and 125° C., thereby requiring considerable energy. Consequently, the conditioning of the potatoes in the pouches is a problem because they have a consistency which makes them difficult to subject to such temperatures.

In spite of their high cost, however, potatoes sterilized in this fashion do not have any culinary advantages and indeed present culinary disadvantages because they develop a sticky consistency and appearance, are sensitive to shock and, because they are entirely cooked by the sterilization at the elevated temperatures, it is not possible to prepare them in certain forms, for example, cut up cold in a vinaigrette sauce or to fry them in a pan.

In many cases, fully sterilized potatoes of the type described have more drawbacks than advantages.

It has been proposed in French applicatiion No. 79 23 860 to overcome some of these drawbacks by a succession of treatments including a pasteurization to obtain potatoes whose storage life may be less than that of sterilized potatoes, but which are produced in a form which permits their use in the same manner as raw potatoes.

Thus the problem of preserving tuber and root vegetables of the types described and especially potatoes so that they can be stored for reasonably long periods without refrigeration, e.g. at room temperature, has long been a perplexing one.

OBJECTS OF THE INVENTION

It is, therefore, the principal object of the present invention to provide a method of treating tuber and root vegetables, and especially potatoes, so as to increase the storage life thereof even at sites at which temperatures of 20° C. and more are maintained, while providing a product which is of comparatively low cost.

Still another object of the invention is to provide a method of treating such vegetables for marketing in a manner which will allow the treated product to be utilized in a variety of ways in which products treated by earlier techniques could not be used.

Yet another object of our invention is to provide a method of treating potatoes and other root and tuber vegetables whereby the drawbacks of earlier systems are obviated and a product is obtained which can be utilized largely in the same manner as the raw vegetable which has a much greater storage life, especially at elevated temperatures such as room temperature or higher.

SUMMARY OF THE INVENTION

These objects and others which will become apparent hereinafter are attained in accordance with the invention, in a method which comprises treating the tuber or root vegetable, after it has been selected, peeled and, if desired cut up, in five successive treatment phases as described below, particularly with respect to potatoes, but also applicable to the other roots and tubers mentioned.

The first treatment phase is a slight pasteurization effected at a temperature between 75° and 85° C.

This initial treatment phase is followed by a conditioning in vacuo in which the vegetable matter is portioned into and sealed in pouches of plastic material.

The conditioning is followed, in the third phase, by an incubation of the residual spores and bacteria which may be present in the potatoes, preferably by maintaining the pouches, previously closed, in a vessel at a temperature of 25° to 35° C. for the incubation period.

This incubation is followed, in the fourth phase, by a pasteurization at a temperature between 85° and 90° C. and, in the fifth phase, the pouches are refrigerated.

The first phase, i.e. the slight pasteurization can be considered a superficial or surface pasteurization of the potatoes. However, although the full pasteurization effect does not penetrate deeply into the potato, the interior thereof is warmed and thus this slight or superficial pasteurization appears to provide a precooking of the interior.

The duration of the first step is preferably 5 to 15 minutes and the slight pasteurization can be carried out either continuously or in a batch (discontinuous) process and in any suitable apparatus. Continuous processing is preferred, however, and we have found that most efficient results are obtained when the superficial sterilization is effected on an endless belt or even more effectively in an endless screw conveyor.

The vacuum treatment can be effected in the packaging apparatus i.e. the apparatus in which the potatoes are placed in their pouches. Apparatus for this operation is well known in the art and need not be described in detail. The conditioning can be thought of, therefore, as a vacuum packing.

The incubation treatment is extremely important to the invention because the promotion of the growth of selected spores and bacteria which have survived the slight sterilization appears to be essential for transforming the product into the effective comestible desired. The incubation is carried out at 25° to 35° C. for a period which is a function of the temperature used. For a temperature of 25° C., the preferred duration is about 24 hours, while at 35° C. the preferred duration is about 14 hours with the treatment times being between these limits at intermediate temperatures.

The incubation phase is preferably carried out in an incubator in which the temperature can be accurately maintained and preferably after the pouches are placed in a rack enabling them to be handled. Any other support, e.g. a tray or basket can be used as well.

The fourth treatment phase, namely the pasteurization, is carried out at a temperature between 85° and 90° C. and is intended to destroy the spores and bacteria which have been transformed into a growth phase by the prior treatment.

The bacteria and spores which are rendered vegatative by the prior treatment generally do not resist temperatures more than 70° C. for more than several minutes. The duration of this pasteurization treatment is a function of the temperature to which the potatoes have been brought during the preceding treatment and of the thickness of the pouches. For example, when the batches are incubated at 35° C. in pouches containing 500 grams each and with a thickness of 40 mm, the pasteurization duration should be 25 minutes.

If the batches are incubated at 25° C. in the same batches, the duration of pasteurization should be 30 to 32 minutes.

In any event, the duration will generally be between 10 minutes and one hour and will be sufficient to raise the interior of the pouches and the interior of the potatoes within the pouches to the sterilization temperature for at least 5 minutes.

BRIEF DESCRIPTION OF THE DRAWING

The sole FIGURE of the accompanying drawing is a flow diagram illustrating a system for carrying out the method of the invention in the case of potatoes.

SPECIFIC DESCRIPTION

In the sole FIGURE of the accompanying drawing a potato peeler 1 discharges the peeled potatoes onto a selection belt 2 which is an endless conveyor flanked by personnel whose task it is to remove from the belt malformed, discolored and spoiled potatoes. Since washing is effected in the peeler, the potatoes then enter a continuous pasteurizer 3 in which they are brought to a temperature of 85° C. with a residence time at this temperature between 5 and 15 minutes.

From this pasteurizer, the potatoes are carried by endless conveyor belts 4 and 5 to a weighing device 6 which weighs and portions the potatoes and introduces them into pouches which are sealed in vacuo. The vacuum packaging apparatus has been represented at 7 and also serves to condition the potatoes in vacuo at a temperature of 60° C. The duration for which the potatoes are maintained at this temperature is not critical.

After having thus been packaged in pouches, the potatoes are transferred by an endless belt 8 to a tunnel 9 in which the pouches are rapidly cooled to a temperature of 40° C. by the spraying of water at a temperature of 25° C. and the pouches as they are continuously advanced through the tunnel.

The potato containing pouches are then transferred manually or mechanically onto racks and placed in an incubation chamber 10 which can be maintained at 25° C. After 24 hours of incubation, the pouches are transferred manually or mechanically, preferably on the aforementioned racks, into a pasteurizer 11 and then into a refrigerator 12. The pasteurization is effected at 85° C. for 30 to 40 minutes and preferably the pouches are refrigerated continuously until sold, although it is also possible to remove them from the refrigeration unit 12 and maintain them at ambient temperature without spoilage for prolonged periods.

The refrigeration can be effected for a period of 3–12 hours at 5° to 15° C.

Among the advantages of the method of the invention is that at no point in the preparation of the potatoes is it necessary to subject them to antioxidant or bleaching treatment using chemical means which can even potentially be dangerous to the health of the consumer.

Even without refrigeration, the product is preserved for a number of months at ambient temperatures without detriment to comestible quality or appearance. The product looks like natural potato, and is neither sensitive toward shock nor easily crushed by handling.

Since any cooking which has been effected is only extremely slight, they can be employed as the raw potato and hence they can be utilized in many recipes requiring raw potato.

The cost of the product is competitive because the treatment does not utilize complicated materials, significant amounts of energy or thick plastic pouches.

We claim:

1. A process for the treatment of a root or tuber vegetable which comprises, after selecting and peeling the vegetable, the steps of:
    (a) slightly pasteurizing the vegetable at a temperature between 75° and 85° C.;
    (b) subjecting the slightly pasteurized vegetable to vacuum conditioning in plastic pouches;
    (c) incubating the vegetable in the plastic pouches after vacuum conditioning to promote a vegetative state of spores and bacteria in the vegetable by maintaining the pouches in a closed condition in a vessel at an incubation temperature between 25° and 35° C.;
    (d) pasteurizing the incubated vegetable at a temperature of 85° to 90°; and
    (e) refrigerating the vegetable pasteurized in step (d).
2. The process defined in claim 1 wherein step (a) is carried out for 5 to 15 minutes.

3. The process defined in claim 1 wherein the temperature of the vegetable is permitted to drop naturally in the transition from step (a) to step (b) to substantially 60° C.

4. The process defined in claim 2 wherein the temperature of the vegetable is permitted to drop naturally in the transition from step (a) to step (b) to substantially 60° C.

5. The process defined in claim 1 wherein said vegetable is packaged at a temperature of 60° C. in vacuo in step (b) in said pouches and the vegetable in said pouches is placed in a chamber in which its temperature is lowered to 40° C. by directing water at 25° at said pouches.

6. The process defined in claim 4 wherein said vegetable is packaged at a temperature of 60° C. in vacuo in step (b) in said pouches and the vegetable in said pouches is placed in a chamber in which its temperature is lowered to 40° C. by directing water at 25° C. at said pouches.

7. The process defined in claim 1 wherein said incubation in step (c) is carried out for a period between 14 hours and 24 hours.

8. The process defined in claim 6 wherein said incubation in step (c) is carried out for a period between 14 hours and 24 hours.

9. The process defined in claim 7 wherein, for a pouch containing 500 grams of vegetable distributed over a thickness of 40 mm, the duration of pasteurization in step (d) is between 22 and 35 minutes.

10. The process defined in claim 1 wherein the duration of pasteurization in step (d) is between 10 and 60 minutes.

11. The process defined in claim 8 wherein the duration of pasteurization in step (d) is between 10 and 60 minutes.

12. The process defined in claim 11 wherein said vegetable is potato.

13. The process as defined in claim 1 wherein after the peeling step, the vegetable is cut up.

* * * * *